June 26, 1923.

W. E. PORTER

METER BEARING

Original Filed Feb. 26, 1917

1,459,987

Inventor:
Willard E. Porter,
by
His Attorney.

Patented June 26, 1923.

1,459,987

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

METER BEARING.

Original application filed February 26, 1917, Serial No. 151,060. Divided and this application filed September 2, 1919. Serial No. 321,032.

*To all whom it may concern:*

Be it known that I, WILLARD E. PORTER, a citizen of the United States, residing at Lynn, in the county of Essex, State of Massachusetts, have invented certain new and useful Improvements in Meter Bearings (division of my copending application, Serial No. 151,060, filed February 26, 1917, for an Electric Meter), of which the following is a specification.

My invention relates to a new and improved bearing. More particularly my invention has for one of its objects an improved meter bearing or jewel support for electric motor meters. Other objects of the invention will be brought out in the course of the following description.

Novel features of the invention which I believe to be patentable are definitely set forth in the appended claims. The manner of construction, arrangement and mode of operation of these features in a meter will be understood from the following description taken in conjunction with the accompanying drawing, in which—

Figure 1:
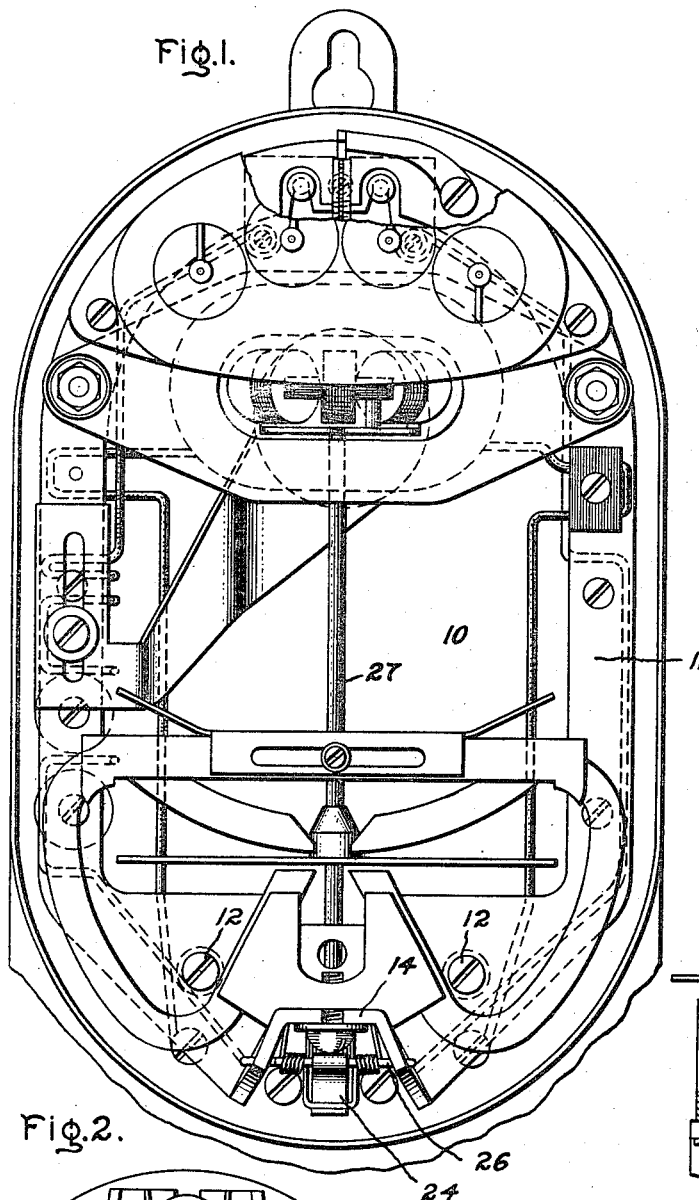
Figure 2:
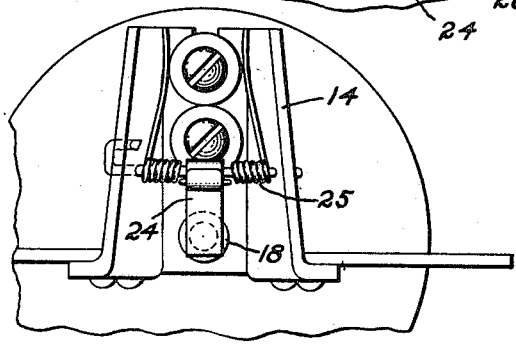
Figure 4:
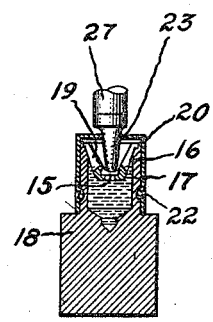
Figure 5:
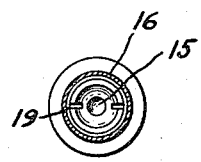
Figure 3:
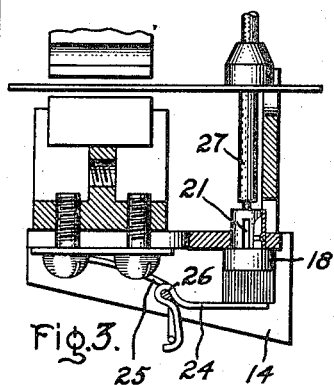

Fig. 1 is a front elevation with the cover removed of an electric meter embodying my present invention; Fig. 2 is a bottom view of a portion of the meter showing the resilient support for the lower jewel; Fig. 3 is a detail sectional elevation showing the support for the lower jewel; Figs. 4 and 5 are detail views of the lower jewel construction.

The meter illustrated is a direct-current motor meter of the type described and claimed in the copending application for Letters Patent of Elihu Thomson, Serial No. 866,043, filed October 10, 1914. The meter has a sheet metal back casing 10. The terminal chamber at the bottom of the casing is not shown in the drawings since it forms no part of the present invention. A non-magnetic frame 11 of substantially oval configuration carries all of the operating elements of the meter. The frame 11 and the operative elements mounted thereon are assembled in the casing as a single unit and hence may be removed for inspection or repair as a single unit. Bolts 12 serve to secure the frame to the back casing at 10. A bracket 14 projects perpendicularly from the lower part of the frame 11. Further details of the meter are not described herein since they form no part of the present invention.

The lower bearing or jewel support for the movable element of the meter is mounted in the bracket 14. The jewel 15 is mounted in the bottom of a metallic cup 16. The cup is removably mounted in the upper portion of a chamber 17 in a supporting plug 18. The plug 18 has an enlarged head with a milled surface, as shown in Fig. 3 of the drawing. The chamber 17 contains a lubricating fluid such, for example, as oil. The cup 16 is provided with slots 19 through which the lubricant can flow on to the bearing surface of the jewel 15. A cylindrical cap 20 having a couple of slits 21 covers the top of the jewel support. The cap is secured in position by one or more indentations on its inner surface made, for example, by a small punch which engages in a circular depression 22 of the plug 18, as will be seen by reference to Figs. 3 and 4 of the drawing. The cap 20 has an opening in its top through which projects the lower pivot pin 23 of the rotatable element of the meter. The plug 18 extends through an aperture in the bracket 14 and is held firmly against the bracket by an L-shaped lever 24 of which the work arm is urged toward the bracket by a coil spring 25 mounted on a pin 26 which is secured in the depending sides of the bracket 14. The movable element of the meter is carried by a shaft 27 at whose lower end is secured the pivot pin 23.

The mode of operation of my improved bearing is now apparent. Due to the provision of the lubricant in the chamber the bearing is adapted to operate for a long time without undue friction. The bearing itself as a whole may be readily inspected or replaced since the lever 24 may be depressed against the action of the spring 25 for the easy withdrawal of plug 18.

While I have shown and described the best form of my invention not known to me, I desire to have it understood that modifications may be made by those skilled in the art without departing in any way from the spirit of my invention as disclosed herein. I desire further to claim all modifications falling fairly within the scope of my invention.

What I claim as new and desire to secure by Letters Patent of the United States, is:—

1. In a meter, in combination, a plug having an enlarged head and a chamber in its opposite end, a metallic cup mounted in said chamber, a non-metallic bearing member adapted to support the movable element of said meter, mounted in said cup, a lubricant in said chamber, said cup having openings communicating with said chamber whereby said lubricant can reach the bearing surface of said member, and a cap covering said chamber and provided with an opening adapted to permit the entry of the movable element of the meter.

2. In a meter, in combination, a support having an aperture, a plug fitting in said aperture, a bearing member adapted to support the movable element of said meter, mounted in said plug, a lever having one member engaging said plug, and means acting on said lever for resiliently holding said lever in position.

3. In a meter, in combination, a stationary support having an aperture at one end, a plug having a shoulder adapted to fit against the sides of said aperture, a bearing member adapted to support the movable element of said meter mounted in said plug, a lever having one arm engaging the bottom of said plug, a spring engaging the other arm of said lever for resiliently urging the shoulder of said plug in contact with the sides of said aperture.

In witness whereof, I have hereunto set my hand this 29th day of August, 1919.

WILLARD E. PORTER.